(12) United States Patent
O'Hara

(10) Patent No.: US 10,902,748 B2
(45) Date of Patent: Jan. 26, 2021

(54) MODULAR AIRCRAFT DISPLAY ARRANGEMENT AND METHOD FOR ASSEMBLING THE SAME

(71) Applicant: Gulfstream Aerospace Corporation, Savannah, GA (US)

(72) Inventor: Timothy O'Hara, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 388 days.

(21) Appl. No.: 15/807,260

(22) Filed: Nov. 8, 2017

(65) Prior Publication Data

US 2019/0139455 A1  May 9, 2019

(51) Int. Cl.
*G09B 25/02* (2006.01)
*A47F 5/00* (2006.01)

(52) U.S. Cl.
CPC .......... *G09B 25/02* (2013.01); *A47F 5/0093* (2013.01)

(58) Field of Classification Search
CPC ................................ G09B 25/00; G09B 25/02
USPC ............. 434/29, 30, 37, 365, 367, 370, 372; 244/118.2, 118.5, 118.6, 120
See application file for complete search history.

(56) References Cited

U.S. PATENT DOCUMENTS

| | | | | |
|---|---|---|---|---|
| 2,388,380 A * | 11/1945 | Bathurst | ................... | B64C 1/22 244/118.2 |
| 2,407,774 A * | 9/1946 | Fowler | ................... | B64C 39/02 244/118.2 |
| 3,028,130 A * | 4/1962 | Burton | ................... | B64D 9/00 244/137.1 |
| 4,736,910 A * | 4/1988 | O'Quinn | ............... | B64C 1/0009 244/118.2 |
| 4,767,334 A * | 8/1988 | Thorne | ................... | A63H 33/00 434/29 |
| 5,031,860 A * | 7/1991 | Ruiz | ...................... | B64D 25/12 244/118.5 |
| 5,509,806 A * | 4/1996 | Ellsworth | ............... | A63G 31/16 434/29 |
| 5,888,069 A * | 3/1999 | Romanoff | ................ | G09B 9/46 434/29 |
| 6,070,831 A * | 6/2000 | Vassiliev | ................... | B64C 1/00 244/117 R |
| 6,106,298 A * | 8/2000 | Pollak | ..................... | G09B 9/003 434/29 |
| 6,213,427 B1 * | 4/2001 | Mareska | ................ | B64D 11/00 244/118.5 |
| 6,382,563 B1 * | 5/2002 | Chiu | ...................... | B64D 25/12 244/120 |
| 6,554,227 B2 * | 4/2003 | Wolter | ................... | B64D 25/12 244/140 |

(Continued)

*Primary Examiner* — Kurt Fernstrom
(74) *Attorney, Agent, or Firm* — LKGlobal | Lorenz & Kopf, LLP

(57) ABSTRACT

Modular aircraft display arrangements and methods for assembling a modular aircraft display arrangements are provided. In one example, a modular aircraft display arrangement includes a fuselage display structure. The fuselage display structure includes a tubular wall at least partially surrounding an interior display space and has a first opening section formed through the tubular wall. A first removable display module includes a first aircraft interior display and is configured to be advanced through the first opening section to a first display position to expose the first aircraft interior display within the interior display space.

17 Claims, 5 Drawing Sheets

(56) References Cited

U.S. PATENT DOCUMENTS

| | | | | |
|---|---|---|---|---|
| 7,093,798 | B2* | 8/2006 | Whelan | B64C 1/0009 |
| | | | | 244/120 |
| 7,234,667 | B1* | 6/2007 | Talmage, Jr. | B64C 1/00 |
| | | | | 244/120 |
| 7,344,109 | B1* | 3/2008 | Rezai | B64C 1/22 |
| | | | | 244/118.2 |
| 8,714,980 | B1* | 5/2014 | Shaub, Sr. | G09B 19/00 |
| | | | | 434/30 |
| 9,193,460 | B2* | 11/2015 | Laudrain | B64C 39/02 |
| 2005/0215168 | A1* | 9/2005 | Kimura | A63H 27/001 |
| | | | | 446/34 |
| 2010/0012782 | A1* | 1/2010 | Hoffjann | B64C 1/0009 |
| | | | | 244/120 |
| 2014/0023996 | A1* | 1/2014 | Finn | G09B 25/00 |
| | | | | 434/72 |
| 2016/0107093 | A1* | 4/2016 | Cheung | A63H 17/002 |
| | | | | 446/92 |

* cited by examiner

MODULAR AIRCRAFT DISPLAY ARRANGEMENT AND METHOD FOR ASSEMBLING THE SAME

TECHNICAL FIELD

The technical field relates generally to aircraft mockup displays, and more particularly, relates to aircraft display arrangements including one or more removable display modules that include an aircraft interior display and methods for assembling such aircraft display arrangements.

BACKGROUND

Full-size or substantially full-scale mock-up displays for aircrafts are useful tools for marketing, demonstrating, and/or promoting aircraft products including new and/or current model products to potential clients or customers. A mock-up aircraft display can simulate, for example, the appearance of a specific aircraft model including the interior cabin, crew area, and other interior area(s) and/or features of the aircraft.

However, such full-size or substantially full-scale mock-up displays require relatively large amounts of retail space for being displayed making it challenging to show various and/or alternative design features. Further, usually the features in a large mock-up display are coordinated and/or aesthetically matched with one another. As such, to display various aircraft features with alternative design features, it may be necessary to build multiple coordinated aesthetically matched full-size or nearly full-scale mock-up displays. This would be an expensive undertaking that would consume correspondingly large amounts of retail space.

Accordingly, it is desirable to provide full-size or substantially full-scale mock-up aircraft displays that overcome one or more of the foregoing concerns. Furthermore, other desirable features and characteristics of the various embodiments described herein will become apparent from the subsequent detailed description and the appended claims, taken in conjunction with the accompanying drawings and this background.

SUMMARY

Modular aircraft display arrangements and methods for assembling a modular aircraft display arrangements are provided herein. In accordance with an exemplary embodiment, a modular aircraft display arrangement includes a fuselage display structure. The fuselage display structure includes a tubular wall at least partially surrounding an interior display space and has a first opening section formed through the tubular wall. A first removable display module includes a first aircraft interior display and is configured to be advanced through the first opening section to a first display position to expose the first aircraft interior display within the interior display space.

In another exemplary embodiment, a modular aircraft display arrangement includes a support stand. A fuselage display structure includes a fuselage base portion and a tubular wall extending generally upward from the fuselage base portion about an interior display space. The fuselage base portion is configured to be supported by the support stand and includes a first track section. The tubular wall has a first opening section formed therethrough adjacent to the first track section. A first removable display module includes a first aircraft interior display and is configured to be advanced through the first opening section along the first track section to a first display position to expose the first aircraft interior display within the interior display space.

In accordance with an exemplary embodiment, a method for assembling a modular aircraft display arrangement is provided. The method includes supporting a fuselage display structure that includes a tubular wall at least partially surrounding an interior display space and that has a first opening section formed through the tubular wall. A first removable display module including a first aircraft interior display is advanced through the first opening section to a first display position to expose the first aircraft interior display within the interior display space.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to aircraft display arrangements and methods for assembling aircraft display arrangements. The exemplary embodiments taught herein provide a modular aircraft display arrangement including a fuselage display structure. In one example, the fuselage display structure is a full-size or substantially full-scale mock-up of a fuselage of a conceptual, new, or existing model of an aircraft. The fuselage display structure includes a tubular wall at least partially surrounding an interior display space and has one or more opening sections including a first opening section formed through the tubular wall.

The modular aircraft display arrangement includes one or more removable display modules including a first removable display module. The first removable display module includes a first aircraft interior display and is configured to be advanced through the first opening section to a first display position to expose the first aircraft interior display within the interior display space. In an exemplary embodiment, the modular aircraft display arrangement further includes one or more alternate removable display modules including a first alternate removable display module. The first alternate removable display module includes a first alternate aircraft interior display that is different than the first aircraft interior display. The first alternate removable display module is configured to be advanced through the first opening section and to replace the first removable display module in the first display position to expose the first alternate aircraft interior display within the interior display space.

In an exemplary embodiment, it has been found that by configuring an aircraft display arrangement as a modular aircraft display arrangement with removable display modules, one or more of the removable display module can be easily exchanged with an alternate removable display module in the fuselage display structure. Advantageously, this allows various aircraft interior displays to be presented for viewing within the same interior display space of the fuselage display structure without requiring any additional full-size or substantially full-scale mockup displays and/or any additional retail space for displaying various aircraft features and/or alternative design features.

A greater understanding of the modular aircraft display arrangement and the method of making the modular aircraft display arrangement discussed above may be obtained through a review of the illustrations accompanying this application together with a review of the detailed description that follows.

Figure 1:
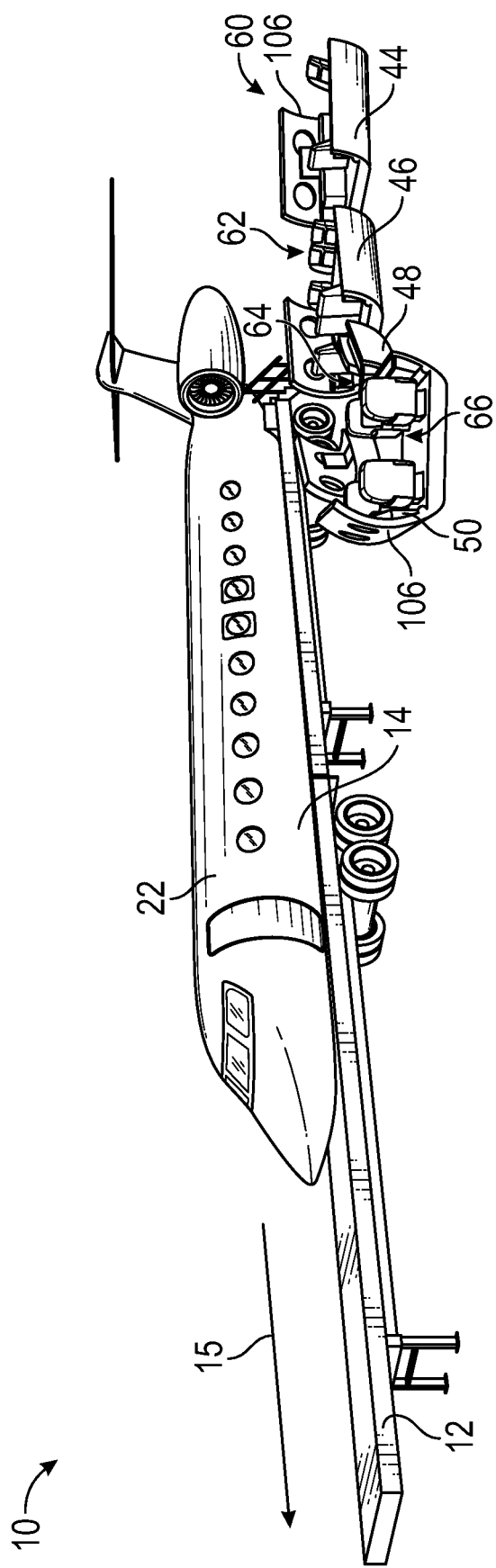
FIG. 1 illustrates a perspective view of a modular aircraft display arrangement in accordance with an exemplary embodiment.
Figure 6:
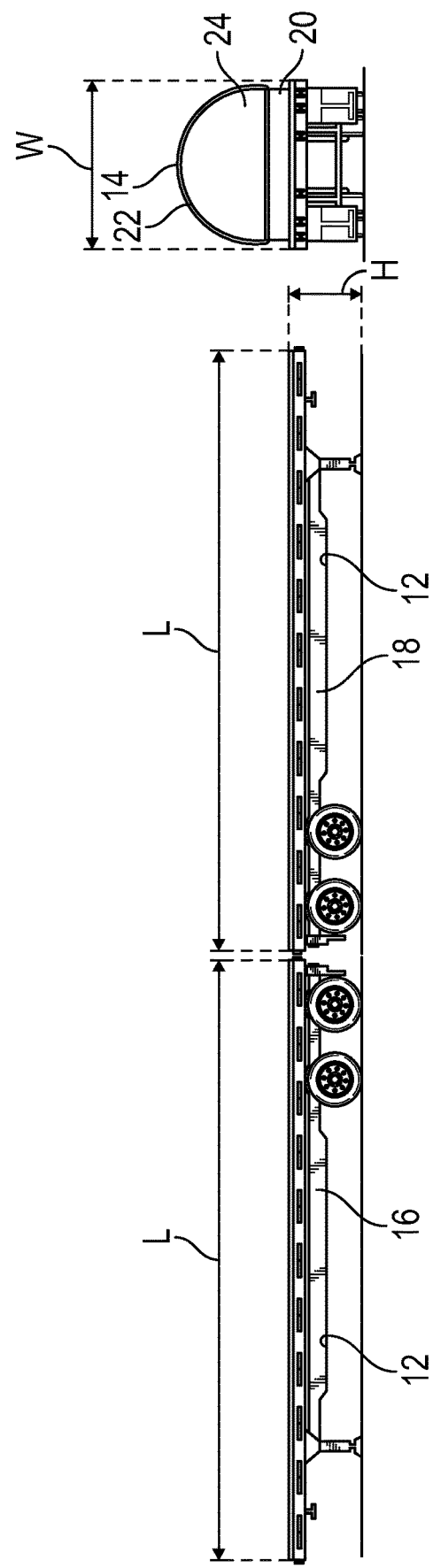
FIG. 6 illustrates a side view of a stand support of a modular aircraft display arrangement and a rear sectional view of a fuselage display structure of the modular aircraft display arrangement on a transport vehicle in accordance with an exemplary embodiment.

FIG. 1 illustrates a perspective view of a modular aircraft display arrangement 10 in accordance with an exemplary embodiment. The modular aircraft display arrangement 10 includes a support stand 12 and a fuselage display structure 14. Referring also to FIG. 6, the support stand 12 is configured to support the fuselage display structure 14, for example, such that the longitudinal axis (indicated by single headed arrow 15) of the fuselage display structure 14 is substantially horizontal. In an exemplary embodiment, the fuselage display structure 14 is a full-size or substantially full-scale mock-up of at least a portion of a fuselage. As illustrated, the support stand 12 includes trailers 16 and 18 (e.g., truck trailers) that are aligned and abutted end to end to provide sufficient length for supporting the fuselage display structure 14. In one example, each of the trailers 16 and 18 have an overall length (L) of from about 45 to about 55 feet (about 13.7 to about 16.8 meters), such as about 48 feet (about 14.6 meters), a height (H) of from about 5 to about 9 feet (about 1.5 to about 2.75 meters), such as about 7 feet (about 2.1 meters), and a width (W) of from about 90 to about 110 inches (about 2.3 to about 2.8 meters), such as about 103 inches (about 2.6 meters).

The fuselage display structure 14 includes a fuselage base portion 20 and a tubular wall 22 extending generally upward from the fuselage base portion 20 about an interior display space 24. In an exemplary embodiment, the fuselage base portion 20 is configured to be supported by the support stand 12, for example, having a substantially flat lower surface that rests on or overlies a substantially flat upper support surface of the support stand 12.

Figure 2:
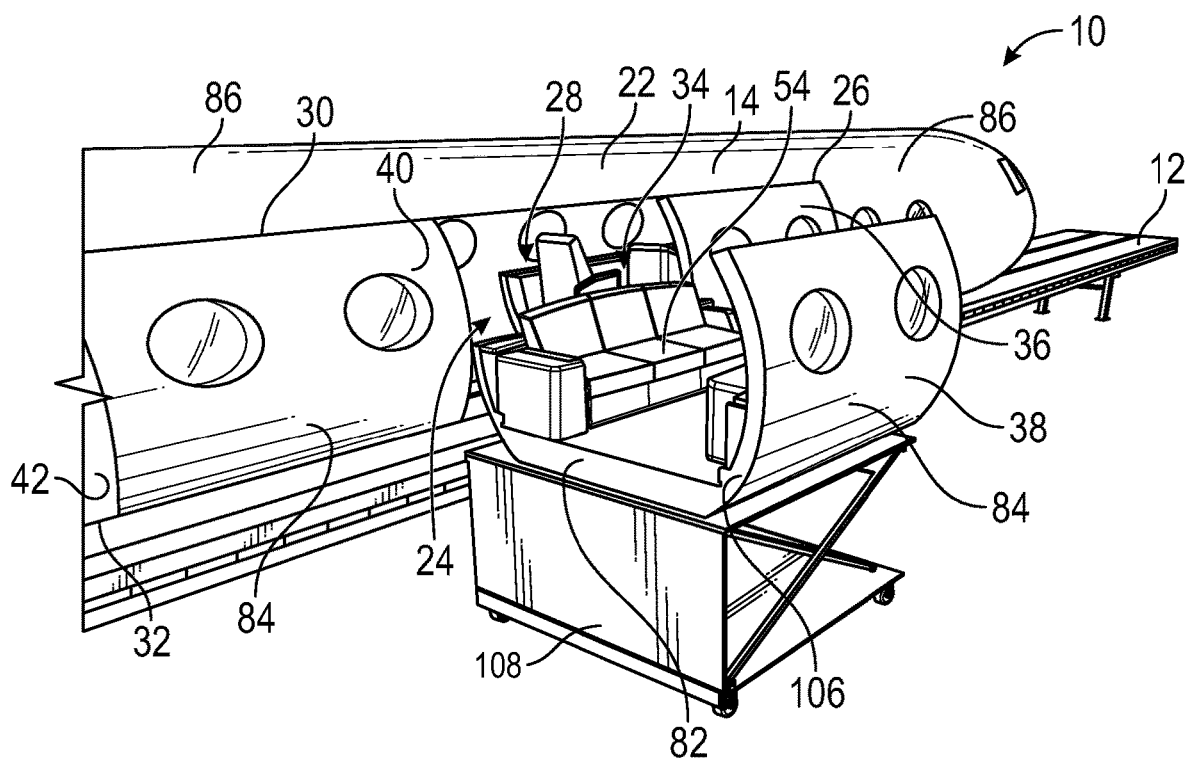
FIG. 2 illustrates a perspective view of a modular aircraft display arrangement in accordance with an exemplary embodiment.
Figure 3:
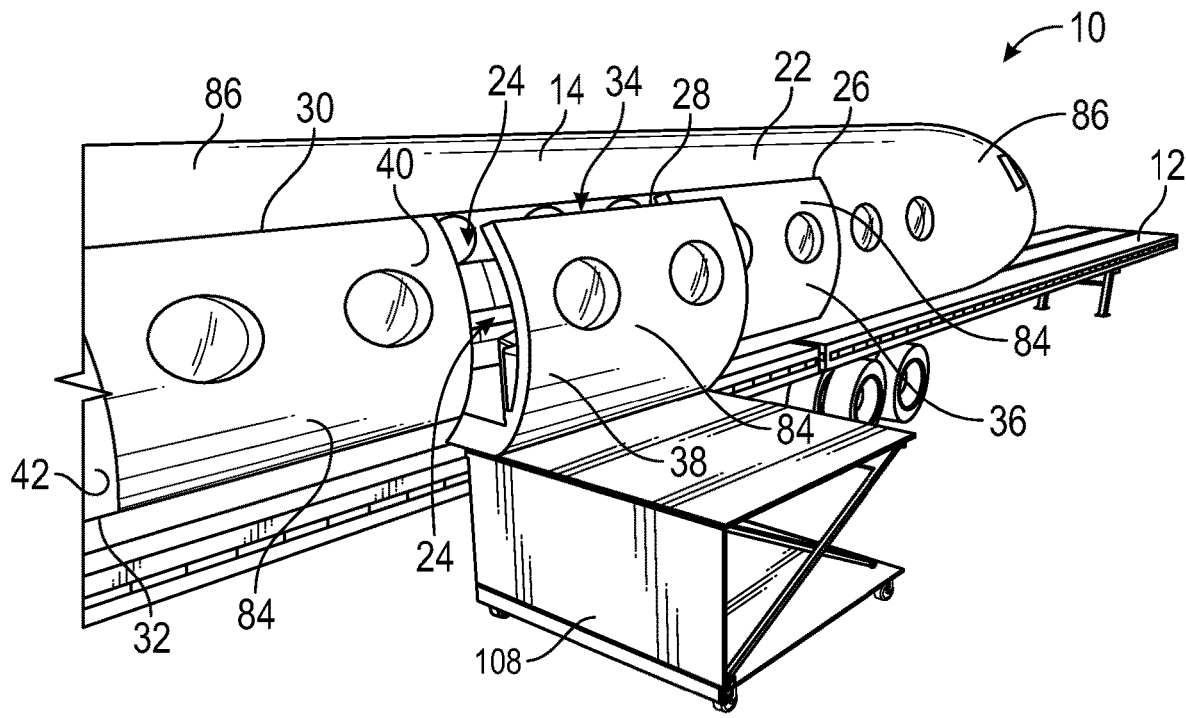
FIG. 3 illustrates a perspective view of a modular aircraft display arrangement in accordance with an exemplary embodiment.

Referring also to FIGS. 2-3, the tubular wall 22 has a plurality of opening sections 26, 28, 30, and 32 formed through a lateral sidewall section of the tubular wall 22. The opening sections 26, 28, 30, and 32 may together form a continuous opening 34 as illustrated, or alternatively, may be separated for example by vertical pillar sections or the like to form multiple spaced apart openings in the lateral sidewall section of the tubular wall 22.

Figure 4:
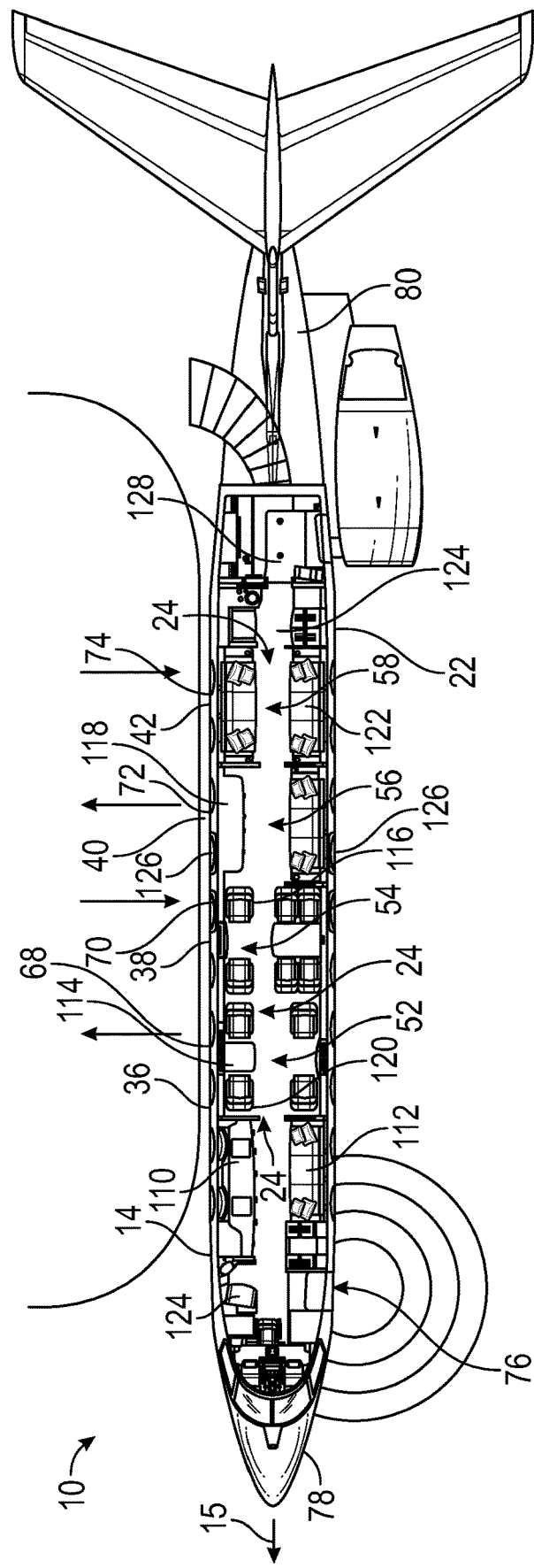
FIG. 4 illustrates a top tear-away view of a modular aircraft display arrangement in accordance with an exemplary embodiment.

Referring also to FIG. 4, the modular aircraft display arrangement 10 includes a plurality of removable display modules 36, 38, 40, and 42 and additional or alternate removable display modules 44, 46, 48, and 50. The removable display modules 36, 38, 40, and 42 each include a corresponding aircraft interior display 52, 54, 56, and 58. Likewise, the additional or alternate removable display modules 44, 46, 48, and 50 each include a corresponding alternate aircraft interior display 60, 62, 64, and 66. The aircraft interior displays 52, 54, 56, and 58 independently may be the same as, similar to, or different than the other aircraft interior displays 52, 54, 56, and 58. Likewise, the alternate aircraft interior displays 60, 62, 64, and 66 independently may be the same as, similar to, or different than the other alternate aircraft interior features 60, 62, 64, and 66. In an exemplary embodiment, the alternate aircraft interior displays 60, 62, 64, and 66 are different than the corresponding aircraft interior displays 52, 54, 56, and 58.

In an exemplary embodiment, each of the aircraft interior displays 52, 54, 56, and 58 and the alternate aircraft interior displays 60, 62, 64, and 66 independently include one or more aircraft interior features (e.g., product features). Non-limiting examples of various aircraft interior features include a side galley 110, a crew rest 112, a console arrangement 114, a seat arrangement 116, a credenza 118, a monitor 120, a divan arrangement 122, a bathroom arrangement 124, a window 126, a storage arrangement 128, or a combination thereof. Other aircraft interior features know to those skilled in the art may also be used and included in the aircraft interior displays 52, 54, 56, and 58 and/or the alternate aircraft interior displays 60, 62, 64, and 66.

The removable display modules 36, 38, 40, and 42 are configured to be advanced through the corresponding opening sections 26, 28, 30, and 32 to display positions 68, 70, 72, and 74 within the fuselage display structure 14 to expose the aircraft interior displays 52, 54, 56, and 58 within the interior display space 24. In particular, the aircraft interior displays 52, 54, 56, and 58 are moved into the display positions 68, 70, 72, and 74 in the interior display space 24 of the fuselage display structure 14 for displaying or presenting the various product features of the aircraft interior displays 52, 54, 56, and 58. In one example, a person (e.g., client, prospective customer, or the like) enters the fuselage display structure 14 through the entrance 76 proximate a forward section 78 of the fuselage display structure 14 and proceeds through the interior display space 24 towards a rearward section 80 of the fuselage display structure 14 for viewing the various product features of the aircraft interior displays 52, 54, 56, and 58.

In an exemplary embodiment, one or more of the removable display modules 36, 38, 40, and 42 may be replaced by one or more of the alternate removable display modules 44, 46, 48, and 50 in the corresponding display position(s) 68, 70, 72, and 74 to expose the corresponding alternate aircraft interior display(s) 60, 62, 64, and 66 within the interior display space 24. That is, one or more of the removable display module(s) 36, 38, 40, and 42 may be moved from its corresponding display position(s) 68, 70, 72, and 74 back through the corresponding opening section(s) 26, 28, 30, and 32 to remove the removable display module(s) from the fuselage display structure 14. Next, one or more of the alternate removable display module(s) 44, 46, 48, and 50 is advanced through the corresponding opening section(s) 26, 28, 30, and 32 to the corresponding display position(s) 68, 70, 72, and 74 within the fuselage display structure 14 to expose the one or more alternate aircraft interior display(s) 60, 62, 64, and 66 within the interior display space 24.

Figure 5A:
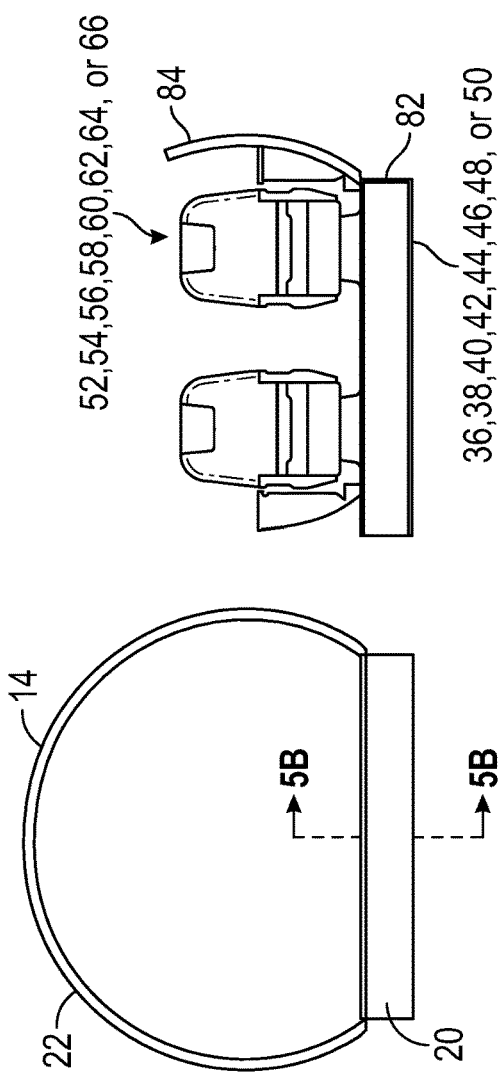
FIG. 5A illustrates a sectional view of a modular aircraft display arrangement in accordance with an exemplary embodiment.
Figure 5B:
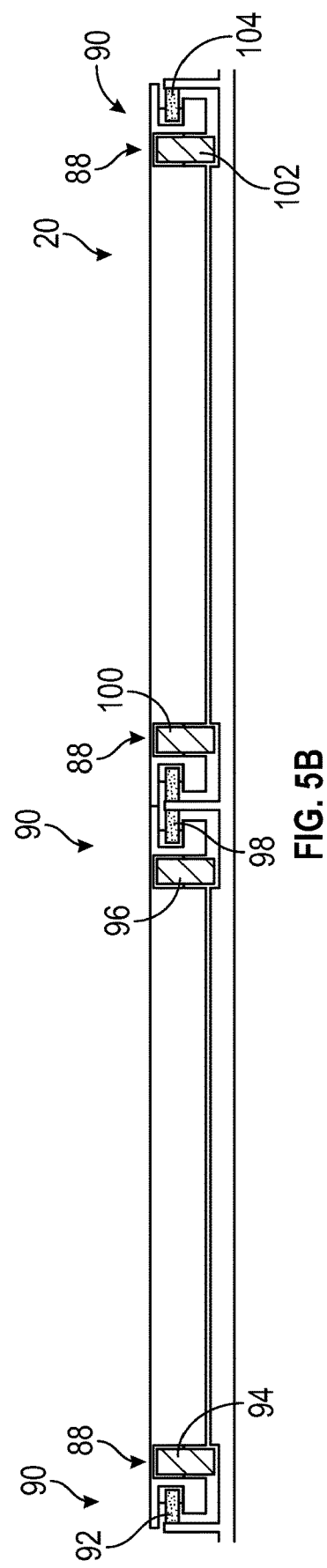
FIG. 5B illustrates a sectional view of a portion of the modular aircraft display arrangement depicted in FIG. 5A along line B-B.

Referring also to FIGS. 5A-5B, in an exemplary embodiment, each of the removable display modules 36, 38, 40, and 42 and, independently, each of the alternate removable display modules 44, 46, 48, and 50 include a module base portion 82 and a module tubular wall section 84 extending generally upward from the module base portion 82 about the corresponding aircraft interior display 52, 54, 56, and 58 or alternate aircraft interior display(s) 60, 62, 64, and 66. In an exemplary embodiment, when the corresponding removable display module 36, 38, 40, and 42 or the corresponding alternate removable display module 44, 46, 48, and 50 are in their designated display position 68, 70, 72, and 74, the module tubular wall sections 84 are aligned with adjacent sections 86 of the tubular wall 22 of the fuselage display structure 14 and with the module tubular wall section(s) 84 of any adjacent removable display module(s) 36, 38, 40, and 42 so as to maintain a substantially tubular outer shape of the fuselage display structure 14.

In an exemplary embodiment, the fuselage base portion 20 of the fuselage display structure 14 is configured to receive and support each of the module base portions 82 of the removable display modules 36, 38, 40, and 42 and the alternate removable display modules 44, 46, 48, and 50. As illustrated, the fuselage base portion 20 includes a plurality of track sections 88 that operatively engages independently each of the removable display modules 36, 38, 40, and 42 and the alternate removable display modules 44, 46, 48, and 50 to facilitate moving the respective removable display module to and from its respective display position 68, 70, 72, and 74. In one example, each of the track sections 88 includes a wheel arrangement 90 formed of a plurality of wheels 92, 94, 96, 98, 100, 102, and 104 that movably or rotationally engage a corresponding removable display modules 36, 38, 40, and 42 and/or a corresponding alternate removable display modules 44, 46, 48, and 50. In one embodiment, the track sections 88 are positioned transverse to the longitudinal axis 15 of the fuselage display structure 14 and correspondingly adjacent to the opening section 26, 28, 30, and 32. As such, the track sections 88 are position to facilitate assembling the modular aircraft display arrangement 10 into position by allowing the respective removable display modules 36, 38, 40, and 42 and/or the alternate removable display modules 44, 46, 48, and 50 to be efficiently advanced through their respective opening section 26, 28, 30, and 32 in directions substantially transverse to the longitudinal axis 15 for easy installation and removal into and from the fuselages display structure 14.

In an exemplary embodiment, each of the removable display modules 36, 38, 40, and 42 and the alternate removable display modules 44, 46, 48, and 50 have an independent stand-alone power unit 106. The stand-alone power unit can include, for example, a power source, e.g., batteries, extension cords, and/or the like.

Referring to FIGS. 2-3, in an exemplary embodiment, the modular aircraft display arrangement 10 further includes a lift apparatus 108. The lift apparatus 108 is configured to lift and laterally move each of the removable display modules 36, 38, 40, and 42 and the alternate removable display modules 44, 46, 48, and 50 about a retail space to facilitate moving a respective removable display module through a designated opening section 26, 28, 30, and 32 for advancing to and from its corresponding display position 68, 70, 72, and 74. In one example, the lift apparatus 108 is a scissor lift for moving the removable display modules 36, 38, 40, and 42 and the alternate removable display modules 44, 46, 48, and 50 vertically and, independently, horizontally. Alternative lift apparatuses known to those skilled in the art may also be used.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A modular aircraft display arrangement comprising:
 a fuselage display structure comprising:
  a tubular wall extending about a longitudinal axis, at least partially surrounding an interior display space, and having a first opening section formed through the tubular wall; and
  a fuselage base portion that includes a first track section positioned transverse to the longitudinal axis adjacent to the first opening section, wherein the tubular wall extends generally upward from the fuselage base portion about the interior display space; and
 a first removable display module comprising a first aircraft interior display and configured to be advanced substantially transverse to the longitudinal axis through the first opening section to a first display position to expose the first aircraft interior display within the interior display space, wherein the fuselage base portion is configured to support the first removable display module, and wherein the first track section operatively engages the first removable display module to facilitate advancing the first removable display module to the first display position.

2. The modular aircraft display arrangement of claim 1, wherein the first aircraft interior display comprises one of a side galley, a crew rest, a console arrangement, a seat arrangement, a credenza, a monitor, a divan arrangement, a bathroom arrangement, a window, a storage arrangement, and a combination thereof.

3. The modular aircraft display arrangement of claim 1, wherein the first removable display module comprises a module base portion and a module tubular wall section extending generally upward from the module base portion about the first aircraft interior display.

4. The modular aircraft display arrangement of claim 3, wherein the module tubular wall section is aligned with an adjacent section of the tubular wall of the fuselage display structure when the first removable display module is in the first display position.

5. The modular aircraft display arrangement of claim 1, further comprising a first alternate removable display module comprising a first alternate aircraft interior display that is different than the first aircraft interior display, wherein the first alternate removable display module is configured to be advanced through the first opening section and to replace the first removable display module in the first display position to expose the first alternate aircraft interior display within the interior display space.

6. The modular aircraft display arrangement of claim 1, wherein the fuselage display structure has a second opening section formed through the tubular wall, and wherein the modular aircraft display arrangement further comprises a second removable display module comprising a second aircraft interior display and configured to be advanced through the second opening section to a second display position to expose the second aircraft interior display within the interior display space.

7. The modular aircraft display arrangement of claim 6, wherein the second aircraft interior display comprises one of a side galley, a crew rest, a console arrangement, a seat arrangement, a credenza, a monitor, a divan arrangement, a bathroom arrangement, a window, a storage arrangement, and a combination thereof.

8. The modular aircraft display arrangement of claim 6, wherein the second removable display module comprises a module base portion and a module tubular wall section extending generally upward from the module base portion about the second aircraft interior display.

9. The modular aircraft display arrangement of claim 8, wherein the module tubular wall section is aligned with an adjacent section of the tubular wall of the fuselage display structure when the second removable display module is in the second display position.

10. The modular aircraft display arrangement of claim 8, wherein the module tubular wall section is aligned with an adjacent module tubular wall section of the first removable display module when the first and second removable display modules are in the first and second display positions, respectively.

11. The modular aircraft display arrangement of claim 6, wherein the first removable display module further comprises a first stand-alone power unit and the second removable display module further comprises a second stand-alone power unit that is independent from the first stand-alone power unit.

12. The modular aircraft display arrangement of claim 1, wherein the first track section comprises a wheel arrangement that movably engages the first removable display module.

13. A modular aircraft display arrangement comprising:
   a support stand;
   a fuselage display structure comprising a fuselage base portion and a tubular wall extending generally upward from the fuselage base portion about a longitudinal axis about an interior display space, wherein the fuselage base portion is configured to be supported by the support stand and comprises a first track section, wherein the tubular wall has a first opening section formed therethrough adjacent to the first track section and wherein the first track section is positioned transverse to the longitudinal axis adjacent to the first opening section; and
   a first removable display module comprising a first aircraft interior display and configured to be advanced substantially transverse to the longitudinal axis through the first opening section along the first track section to a first display position to expose the first aircraft interior display within the interior display space, wherein the fuselage base portion is configured to support the first removable display module, and wherein the first track section operatively engages the first removable display module to facilitate advancing the first removable display module to the first display position.

14. The modular aircraft display arrangement of claim 13, wherein the fuselage base portion comprises a second track section, wherein the tubular wall has a second opening section formed therethrough adjacent to the second track section, and wherein the modular aircraft display arrangement further comprises a second removable display module comprising a second aircraft interior display and configured to be advanced through the second opening section along the second track section to a second display position to expose the second aircraft interior display within the interior display space.

15. The modular aircraft display arrangement of claim 14, wherein the first and second track sections are configured to facilitate advancing the first and second removable display modules through the first and second opening sections to the first and second display positions, respectively, in corresponding directions substantially transverse to the longitudinal axis.

16. The modular aircraft display arrangement of claim 13, further comprising a lift apparatus that is configured to lift the first removable display module outside of the fuselage display structure and to facilitate moving the first removable display module to the first opening section for advancing the first removable display module to the first display position.

17. A method for assembling a modular aircraft display arrangement, the method comprising the steps of:
   supporting a fuselage display structure that comprises a tubular wall extending about a longitudinal axis, at least partially surrounding an interior display space, and that has a first opening section formed through the tubular wall;
   positioning a fuselage base portion including a first track section such that the first track section is transverse to the longitudinal axis and adjacent to the first opening section, and such that the tubular wall section extends generally upward from the fuselage base portion; and
   advancing a first removable display module comprising a first aircraft interior display substantially transverse to the longitudinal axis along the first track section through the first opening section to a first display position to expose the first aircraft interior display within the interior display space.

* * * * *